United States Patent
Nakazawa

(10) Patent No.: US 8,526,078 B2
(45) Date of Patent: Sep. 3, 2013

(54) SENSOR DRIVING CIRCUIT, DRIVER DEVICE, IMAGE READING APPARATUS, AND IMAGE FORMING APPARATUS

(75) Inventor: Masamoto Nakazawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 323 days.

(21) Appl. No.: 12/877,528

(22) Filed: Sep. 8, 2010

(65) Prior Publication Data

US 2011/0063488 A1    Mar. 17, 2011

(30) Foreign Application Priority Data

Sep. 11, 2009   (JP) ................................. 2009-210397

(51) Int. Cl.
*H04N 1/04*   (2006.01)

(52) U.S. Cl.
USPC ............................ 358/483; 358/482; 358/474

(58) Field of Classification Search
USPC ............... 358/483, 482, 474, 1.13, 465, 446; 382/372
See application file for complete search history.

(56) References Cited

U.S. PATENT DOCUMENTS

| | | | | |
|---|---|---|---|---|
| 4,183,460 A * | 1/1980 | Yuen et al. | ..................... | 714/732 |
| 4,428,652 A * | 1/1984 | Sakai et al. | ..................... | 396/99 |
| 5,585,840 A * | 12/1996 | Watanabe et al. | ................ | 348/65 |
| 6,995,786 B2 * | 2/2006 | Abe et al. | .......................... | 348/65 |
| 7,355,625 B1 | 4/2008 | Mochida et al. | | |
| 7,466,355 B2 * | 12/2008 | Takami | .......................... | 348/312 |
| 7,557,849 B2 * | 7/2009 | Pan et al. | ...................... | 348/312 |
| 7,598,985 B2 * | 10/2009 | Sasaki | ......................... | 348/222.1 |
| 7,606,470 B2 * | 10/2009 | Shimizu et al. | ................ | 386/328 |
| 7,755,669 B2 * | 7/2010 | Shiomi | ....................... | 348/222.1 |
| 7,791,658 B2 * | 9/2010 | Noguchi | ........................ | 348/265 |
| 8,031,252 B2 * | 10/2011 | Segami et al. | ................. | 348/313 |
| 8,248,464 B2 * | 8/2012 | Takahashi | ........................ | 348/65 |
| 2004/0165104 A1 * | 8/2004 | Takami | .......................... | 348/372 |
| 2005/0001927 A1 * | 1/2005 | Tanimoto | ..................... | 348/372 |
| 2006/0077276 A1 * | 4/2006 | Noguchi | ....................... | 348/312 |
| 2007/0188638 A1 | 8/2007 | Nakazawa et al. | | |
| 2008/0252787 A1 | 10/2008 | Nakazawa et al. | | |
| 2010/0171998 A1 | 7/2010 | Nakazawa | | |

FOREIGN PATENT DOCUMENTS

| | | |
|---|---|---|
| JP | 53-136927 | 11/1978 |
| JP | 62-143091 | 6/1987 |
| JP | 07-135456 | 5/1995 |
| JP | 11-177783 | 7/1999 |
| JP | 2000-101934 | 4/2000 |
| JP | 2001-145099 | 5/2001 |
| JP | 2008-072392 | 3/2008 |

OTHER PUBLICATIONS

Office Action mailed Jun. 4, 2013, in Japanese Patent Application No. 2009-210397.

* cited by examiner

*Primary Examiner* — Negussie Worku

(74) *Attorney, Agent, or Firm* — Oblon, Spivak, McClelland, Maier & Neustadt, L.L.P.

(57) ABSTRACT

There is provided a sensor driving circuit that includes: an image sensor that converts light reflected from an original to be read into electric signals; a driver circuit that drives the image sensor; and a timing generator circuit that outputs timing signals for use in control of the image sensor. The driver circuit includes a first inverting buffer circuit and a second inverting buffer circuit that are equivalent to each other and arranged in series connection of two stages with the first inverting buffer circuit at the first stage of the two stages. The timing signal output from the timing generator circuit has the same polarity as the polarity of an input signal fed to the image sensor.

10 Claims, 11 Drawing Sheets

FIG. 3
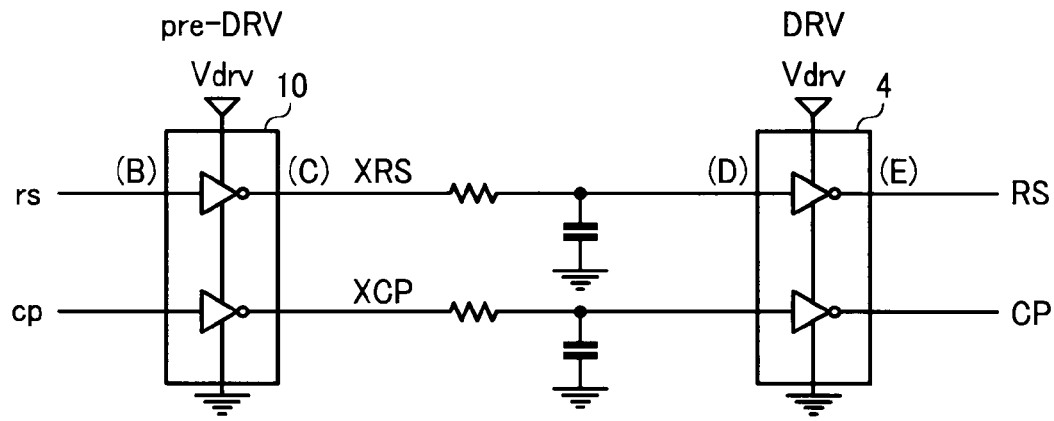
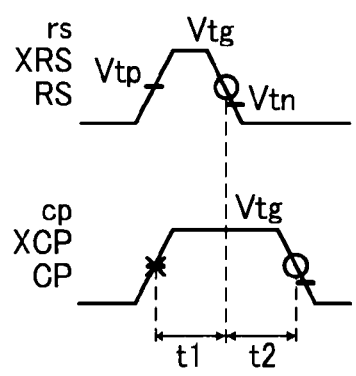
(B) INPUT OF pre-DRV
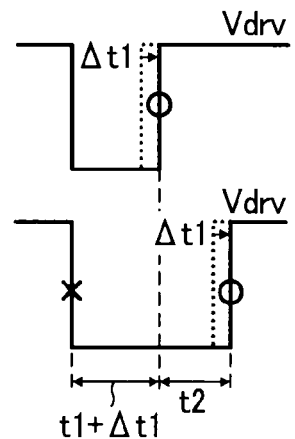
(C) OUTPUT OF pre-DRV
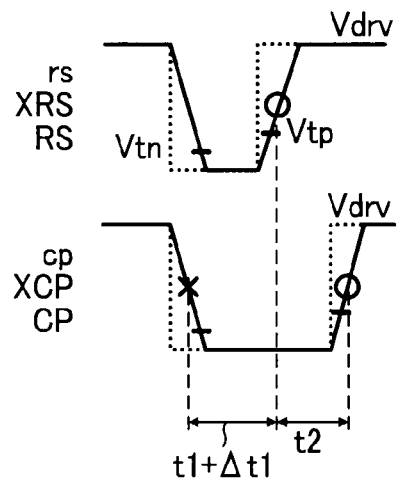
(D) INPUT OF DRV
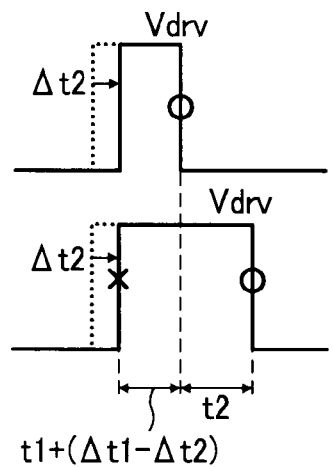
(E) OUTPUT OF DRV

FIG. 4
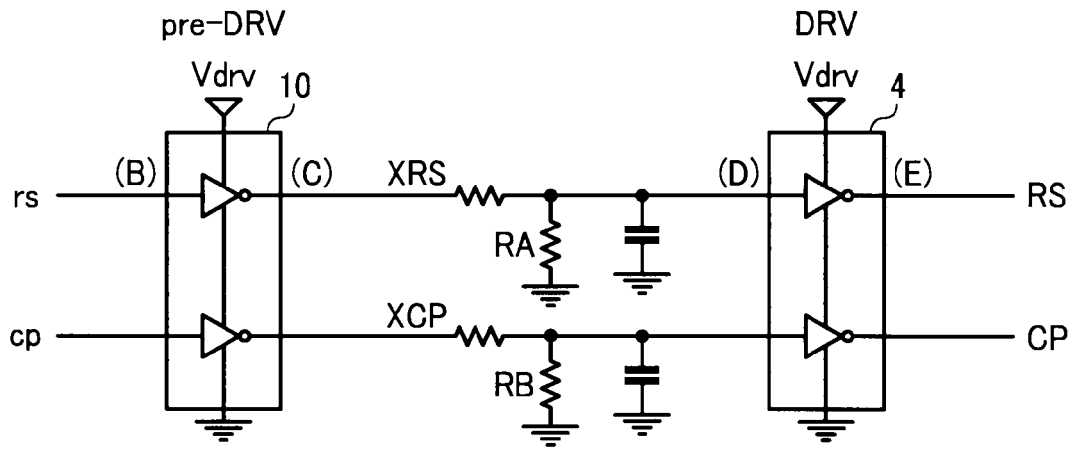
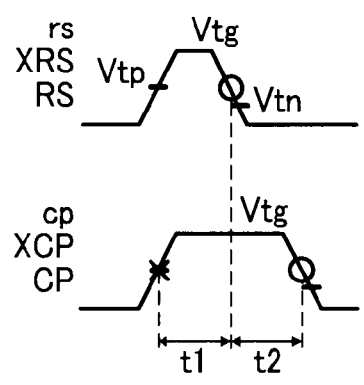
(B) INPUT OF pre-DRV
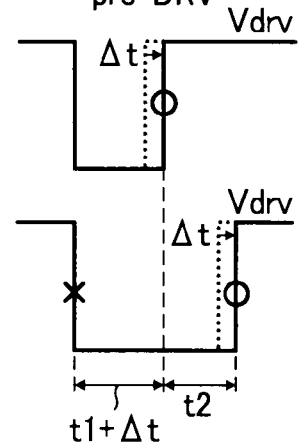
(C) OUTPUT OF pre-DRV
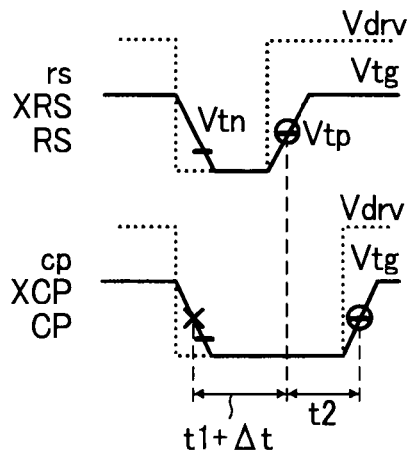
(D) INPUT OF DRV
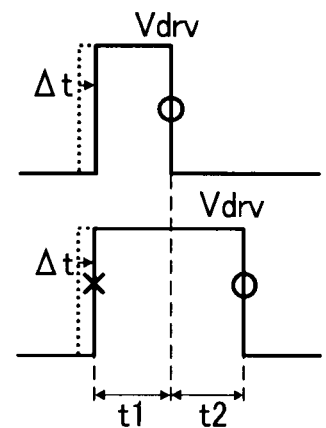
(E) OUTPUT OF DRV FIG. 5
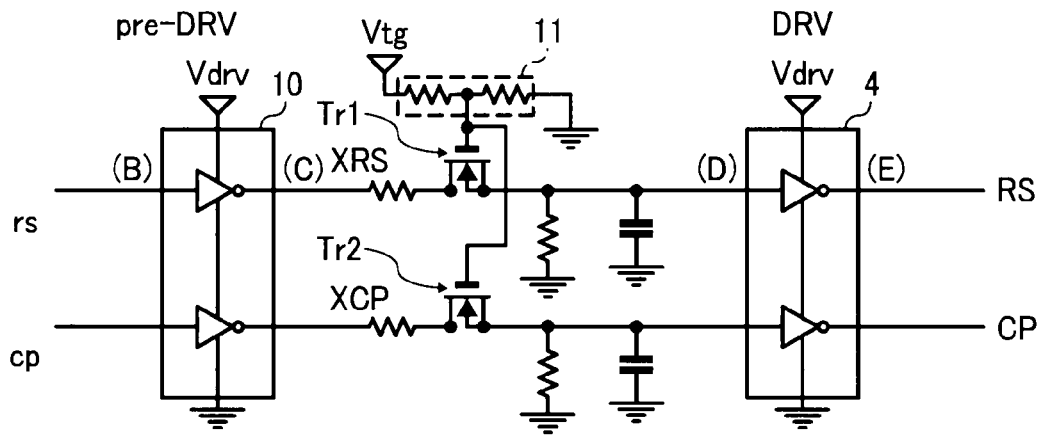
(B) INPUT OF pre-DRV
(C) OUTPUT OF pre-DRV
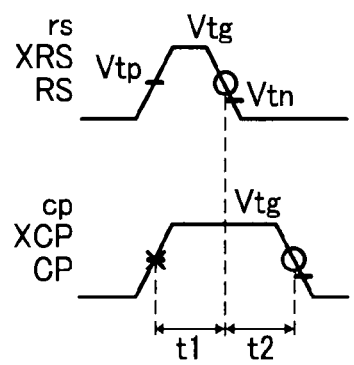 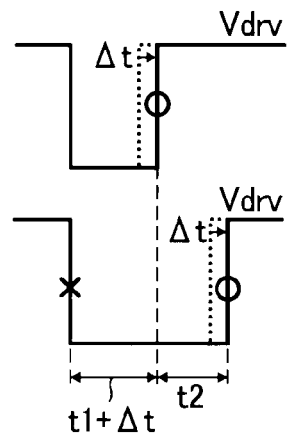
(D) INPUT OF DRV
(E) OUTPUT OF DRV
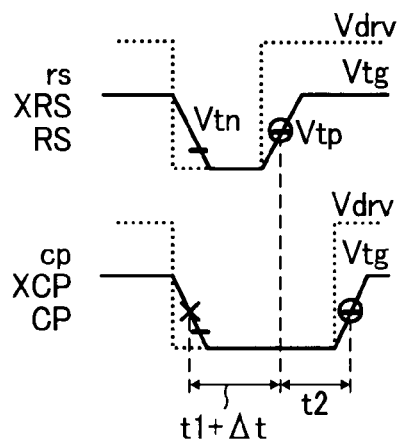 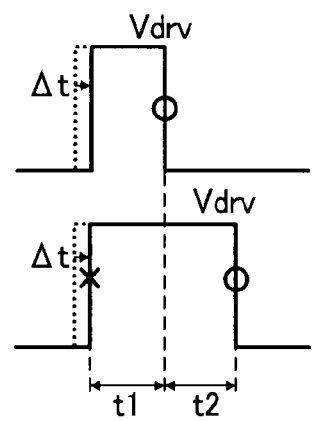

FIG. 12
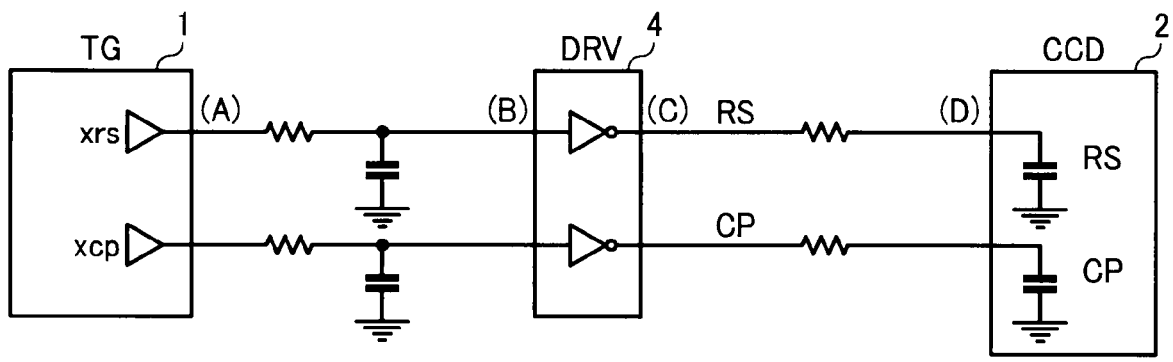
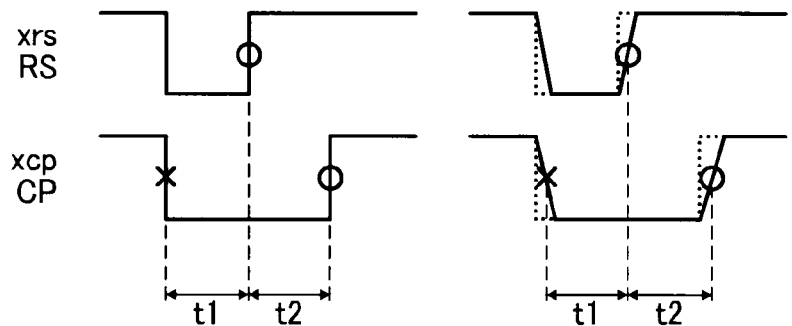
(A) OUTPUT OF TG  (B) INPUT OF DRV
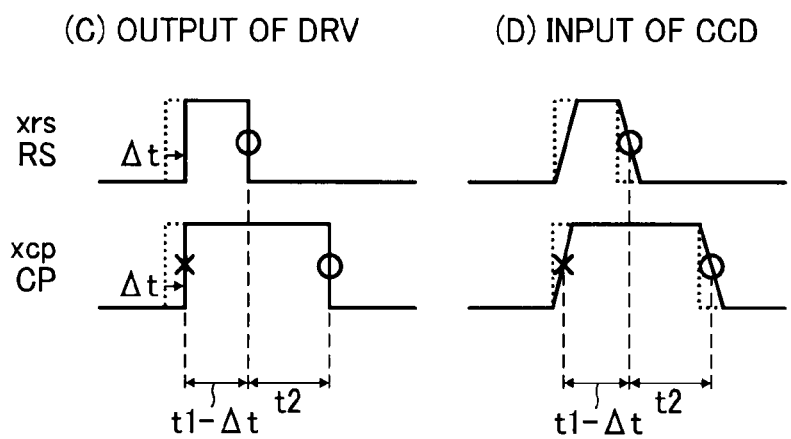
(C) OUTPUT OF DRV  (D) INPUT OF CCD

FIG. 13
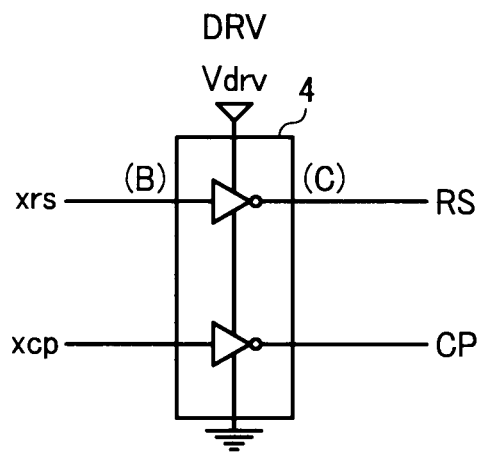
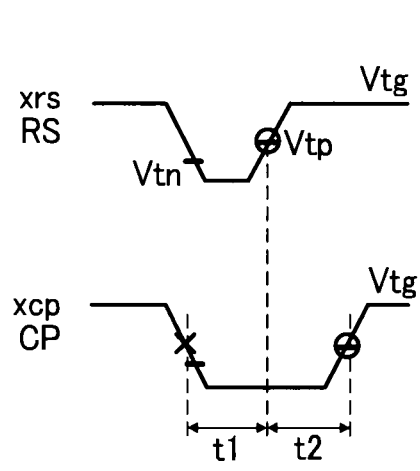
(B) INPUT OF DRV
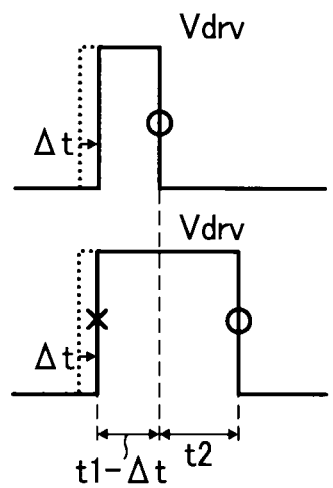
(C) OUTPUT OF DRV

TITLE: SENSOR DRIVING CIRCUIT, DRIVER DEVICE, IMAGE READING APPARATUS, AND IMAGE FORMING APPARATUS

CROSS-REFERENCE TO RELATED APPLICATIONS

The present application claims priority to and incorporates by reference the entire contents of Japanese Patent Application No. 2009-210397 filed in Japan on Sep. 11, 2009.

BACKGROUND OF THE INVENTION

1. Field of the Invention

The present invention relates to a sensor driving circuit, a sensor driver device, an image reading apparatus, and an image forming apparatus capable of decreasing influence of skew among signals having different edges.

2. Description of the Related Art

Charge-coupled device (CCD) line image sensors (hereinafter, referred to as "CCD") have been employed in an image reading apparatus as photoelectric converter for reading images of an original. There may be cases where variation in threshold voltages, and difference in delay time of rise time (hereinafter, "rise delay time") and in delay time of fall time (hereinafter, "fall delay time") of a CCD driver that drives the CCD and variation in the difference are not negligible, making it difficult to secure timing appropriately. To this end, techniques of supplying signals, on which timing is stipulated, via a single same driver so as to reduce timing variation (skew) and to secure signal timing have already been known.

For instance, Japanese Patent Laid-open Publication No. H11-177783 discloses a configuration, in which a drive signal, which serves as reference for timing of output signals of a CCD (hereinafter, "CCD output signal"), and an output signal of a sample-and-hold circuit (hereinafter, "sample/hold signal") in an analog-front-end (AFE) are supplied via a single driver so as to reduce skew between the CCD output signal and the sample/hold signal.

An example of a driving circuit according to a conventional technique is described below.

FIG. 10 is a functional block diagram of a conventional driving circuit that drives a CCD 2 and an AFE 3.

A timing generator (TG) 1 generates various clock signals and gate signals required by the CCD 2 and the AFE 3. A CCD-drive clock signal xCCD_clk, which is one of the output signals of the TG 1, is inputted to the CCD 2 via a CCD driver (hereinafter, "DRV") 4. Because an inverting driver, which is advantageous in terms of speed, is typically used as the DRV 4, an output signal CCD_CLK of the DRV 4 is inverted relative to the CCD-drive clock signal xCCD_clk in the configuration illustrated in FIG. 10. The CCD 2 outputs an analog image signal SIG. After being buffered in an emitter follower (EF) 5, the analog image signal SIG is inputted to the AFE 3 via a coupling capacitor 6.

The AFE 3 conducts sampling-and-holding, clamping, offset correction, signal amplification, and the like on the analog image signal SIG and the analog image signal SIG is eventually subjected to analog-to-digital (A/D) conversion. The digital image data D is outputted from the AFE 3. Meanwhile, a sample/hold signal SHD supplies a signal xshd that is outputted from the TG 1 to the AFE 3 via the DRV 4.

The sample/hold signal SHD is inverted relative to the signal xshd as in the case described above. The sample/hold signal SHD may not necessarily need to pass through the DRV 4; however, in order to reduce skew between an output signal of the CCD (whose output timing depends on the signal COD_CLK) and the sample/hold signal SHD, the sample/hold signal SHD and the output signal of the CCD are supplied via the same driver in this configuration.

When a stipulation on the timing between a master clock signal in the AFE 3 and the sample/hold signal SHD is relatively less severe, an output signal MCLK of the TG 1 is directly supplied to the AFE 3 in this configuration. However, when the stipulation on the timing is relatively severe, the output signal of the TG 1 may be supplied to the AFE 3 via the DRV 4.

FIG. 11 is an explanatory circuit diagram illustrating details of the driving circuit depicted in FIG. 10. It should be noted that circuits and devices will be described below by way of examples of complementary metal oxide semiconductor (CMOS) circuits and devices. In FIG. 11, capacitance components described on each of the input terminals of the CCD 2 and the AFE 3 indicates that input loads viewed from input pins of an IC device that includes the CCD 2 and the AFE 3 are capacitive loads. In other words, such capacitors are not actually provided at the input terminals.

The CCD-drive clock signal CCD_CLK depicted in FIG. 10 actually includes a plurality of signals, such as charge-transfer clock signals PH1A and PH2A, a last-stage-transfer clock signal PH2L, a resetting clock signal RS, a clamping clock signal CP, and a shift gate signal SH for driving the CCD 2.

As described above with reference to FIG. 10, the sample/hold signal SHD is supplied to the AFE 3 via the DRV 4. In the circuit depicted in FIG. 11, voltage division by using a resistor is performed so as to satisfy an input range for the AFE 3. Outputs of the DRV 4 are connected in parallel to increase drivability of the DRV 4 to drive the charge-transfer clock signals PH1A and PH2A whose loads are relatively large.

The CCD 2 has two channels. A charge-transfer clock signal PH1A for one of the channels and a charge-transfer clock signal PH2A for the other are output from the TG 1 independently. When timing requirement is imposed on signals, skew between the signals is reduced. Accordingly, each pair of signals is configured to be supplied from a single IC device from among a plurality of IC devices that form the DRV 4. Examples of the pair include a pair of charge-transfer clock signals PH1A and PH2A that are to be fed to a first channel, which is one of the channels, a pair of charge-transfer clock signals PH1A and PH2A that are to be fed to a second channel, which is the other one, a pair of the last-stage transfer clock signal PH2L and a resetting clock signal RS, a pair of the resetting clock signal RS and a clamping clock signal CP, a pair of the last-stage transfer clock signal PH2L and the sample/hold signal SHD, and a pair of the resetting clock signal RS and the sample/hold signal SHD. In the example illustrated in FIG. 11, the DRV 4 includes three IC devices, or, more specifically, IC devices DRVa, DRVb, and DRVc.

Resistor-capacitor (RC) circuits for use in timing fine adjustment are provided between the TG1 and the DRV 4, and between the CCD 2 and the AFE 3. In FIG. 11, the CCD output signal SIG is omitted.

Problems in the driving circuit illustrated in FIG. 10 and FIG. 11 are described below.

FIG. 12 is a schematic block diagram for illustrating effects and the problems of the driving circuit according to the conventional technique with timing charts for explaining operations.

As a condition for causing the CCD 2 to operate appropriately, timing of the signals contained in the CCD-drive clock signal CCD_CLK described above, or signal-to-signal timing, is stipulated. For instance, it is required to cause the pair of the charge-transfer clock signal PH1A and the charge-transfer clock signal PH2A to have the voltage (referred to as "crosspoint voltage"), at which the clock signals have the same signal voltage, of 1.5 V or higher. In addition, it is required to ensure at least 4 to 5 nanoseconds (ns) or longer period of time where the voltage difference between the charge-transfer clock signal PH1A and the charge-transfer clock signal PH2A is 4.5 V or higher.

Such stipulation as described above is also set for the charge-transfer clock signal PH1A and the last-stage-transfer clock signal PH2L. Similar stipulation is set also for the resetting clock signal RS, the clamping clock signal CP, and the last-stage-transfer clock signal PH2L. More specifically, timing is stipulated among these signals, and a minimum "high" width is stipulated for each of the resetting clock signal RS and the clamping clock signal CP. It is necessary to satisfy these timing requirements even when there is variation in characteristics of component part. Failure to satisfy these requirements may result in deficiency related to characteristics, such as transfer efficiency or noise.

The block diagram in FIG. 12 illustrates a conventional driving circuit. The timing charts indicated by (A), (B), (C), and (D) in FIG. 12 illustrate relative timing relation by way of an example of the pair of the resetting clock signal RS and the clamping clock signal CP. Referring to FIG. 12, the resetting clock signal RS and the clamping clock signal CP are inputted into the CCD 2 via the DRV 4 in the same package (IC device) as illustrated in FIG. 11.

The signals xrs and xcp that are outputted from the TG 1 are inputted into the DRV 4 via an RC circuit. The signals xrs and xcp are inverted by an inverter circuit in the DRV 4 and outputted from the DRV 4 as the signals RS and CP, which are then inputted into the CCD 2 via a resistor circuit (or an RC circuit).

The phase difference between a rising edge of the signal xrs indicated by "circle" and a rising edge of the signal xcp indicated by "circle" is t2 (see the timing diagram illustrated by (A) of FIG. 12) at a stage outputted from the TG 1. The signals outputted from the TG 1 are inputted into the DRV 4 via the RC circuit. The relation between the rising edge of the signal xrs and the rising edge of the signal xcp remains the same at the input of the DRV 4 (see the timing diagram illustrated by (B) of FIG. 12).

Although outputs (the signals RS and CP) of the DRV 4 are delayed relative to inputs of the DRV 4, because the signals RS and CP have the same fall delay time at the output (hereinafter, "output fall delay time"), the phase difference at the output stage of the DRV 4 remains the same (see the timing diagram illustrated by (C) of FIG. 12). The outputs of the DRV 4 are inputted into the CCD 2 via the resistor circuit. Because the phase difference at the output of the DRV 4 remains the same, the phase difference between the falling edge of the signal RS and the falling edge of the signal CP at the input of the CCD 2 is not changed (see the timing diagram illustrated by (D) of FIG. 12).

In other words, as for the timing between the same rising edges or between the same falling edges (hereinafter, "same edges"), the phase difference at the output stage of the TG 1 is maintained at the input stage of the CCD 2, which allows easy timing adjustment. This is because the signals RS and CP are fed via the single package driver (DRV 4), skew between the falling edge of the signal RS and the falling edge of the signal CP is restrained.

However, similar effect is not achieved with timing between a rising edge and a falling edge (hereinafter, "different edges"), such as timing between the rising edge of the signal xrs indicated by "circle" and the falling edge of the signal xcp indicated by "x."

The phase difference between the rising edge of the signal xrs and the falling edge of the signal xcp at the output of the TG 1 is t1 (see the timing diagram illustrated by (A) of FIG. 12). The outputs of the TG 1 are inputted into the DRV 4 via the RC circuit. The relation between the rising edge of the signal xrs and the falling edge of the signal xcp is not changed in the DRV 4 (see the timing diagram illustrated by (B) of FIG. 12).

The outputs (the signals RS and CP) of the DRV 4 are delayed relative to the inputs of the DRV 4. In the signal RS "an output fall delay time" is produced, while in the signal CP "an output rise delay time" is produced, which are different from each other. Accordingly, there is produced a relative phase difference corresponding to the difference (Δt) between the output fall delay time and the output rise delay time at the output of the DRV 4. In other words, the phase difference at the input of the DRV 4 is t1, whereas the phase difference at the output of the DRV 4 is t1−Δt (see the timing diagram illustrated by (C) of FIG. 12). Because it is assumed that the output rise delay time is longer than the output fall delay time, the phase difference changes in a decreasing direction.

The outputs of the DRV 4 are inputted into the CCD 2 via the resistor circuit. Because the phase difference remains the same at the output of the DRV 4, the phase difference between the falling edge of the signal RS and the rising edge of the signal CP at the input of the CCD 2 is t1−Δt (see the timing diagram taken at (D) of FIG. 12). This means that skew between the falling edge of the signal RS and the rising edge of the signal CP is not restrained even if the signals RS and CP are supplied via the single package driver (DRV 4).

The phase difference Δt is produced mainly because the output rise delay time (tpLH) and the output fall delay time (tpHL) of the DRV 4 are not equal to each other. This may be expressed as Δt≈tpLH−tpHL. When a CMOS device is used as the DRV 4, tpLH and tpHL depend on characteristics of PMOS (type-transistor) and of NOMOS (type-transistor) at the output stage of the DRV 4. PMOS and NMOS differ from each other in structure (carriers of PMOS are holes whereas carriers of NMOS are electrons whose mobility is larger than that of holes), therefore generally NMOS is more advantageous than PMOS in terms of speed.

More specifically, because the operation speed of NMOS that is turned on at fall of a signal is greater than operation speed of PMOS that is turned on at rise of a signal, tpHL is shorter than tpLH.

It should be noted that when PMOS transistors and NMOS transistors are arranged on a single semiconductor chip as in a typical CMOS semiconductor device, characteristic correlation between the PMOS transistors and correlation between the NMOS transistors exist (in other words, the PMOS transistors are likely to be identical with each other in characteristics and the NMOS transistors are likely to be identical with each other in characteristics), whereas characteristic correlation between a PMOS transistor and a NMOS transistor does not exist (in other words, characteristics of the PMOS transistor and characteristics of the NMOS transistor vary independently of each other).

If signals are inputted to the DRV 4 that is the single package driver (single semiconductor chip), relative phase difference (skew) is not produced between the same edges because the same edges have the same delay time, whereas skew is produced between different edges because of different delay time. As described above, because the characteristics of PMOS and NMOS vary independently of each other, tpLH and tpHL vary independently of each other, causing Δt to vary widely.

As described above, even when signals are inputted via a single package driver, skew between different edges resulting from variation in difference between tpLH and tpHL remains large, which makes it difficult to satisfy signal timing. A relatively fast device whose tpLH and tpHL each is approximately 2 to 6 ns is employed as the DRV 4, even in a situation mentioned above, when tpLH and tpHL vary independently of each other, skew of ±4 ns (8 ns in width) at maximum is produced. When the skew is converted into frequency that may be drivable by CCDs which are currently in a mainstream, it is assumed that upper limit is approximately 25 MHz (half cycle: 20 ns) (more specifically, allowable rise/fall time: 3 ns times 2, allowable variation: 8 ns, and timing-adjustment period: 6 ns). It will be difficult to achieve operation speed higher than this.

Skew resulting from variation in difference between tpLH and tpHL of the DRV 4 has been described above. Not only this variation, but also variation in threshold voltages of the DRV 4 may be a cause of skew.

FIG. 13 is a schematic block diagram with timing charts for illustrating how skew is produced by the threshold voltages (at inputs and outputs of the DRV 4) in the conventional driving circuit. The circuit diagram in FIG. 13 depicts only a portion around the DRV 4 illustrated in FIG. 12.

The threshold voltages are generally defined such that a threshold voltage at rise input (Vtp) and a threshold voltage at fall input (Vtn) differ from each other in a similar way as in the case of the output delay time.

Referring to FIG. 13, the signals xrs and xcp output from the TG 1 (not shown in FIG. 13) are inputted into the DRV 4 (see the timing diagram taken at (B) of FIG. 13). Peak signal level (hereinafter, "high level") of the output signals xrs and xcp of the TG 1 is the same as that of supply voltage (Vtg) supplied to the TG 1. In the example illustrated in FIG. 13, Vtp is approximately a half of Vtg whereas Vtn is approximately a quarter of Vtg. A period of time from rise start of the signals xrs and xcp to a point in time where the signals reach Vtp may be expressed as approximately $0.69\tau$, where t is a time constant of the signals. A period of time from fall start of the signals to a point in time where the signals reach Vtn may be expressed as approximately $1.39\tau$.

Accordingly, the phase difference between a falling edge (indicated by "circle") of the output signal RS of the DRV 4 and a rising edge (indicated with "x") of the output signal CP of the DRV 4 produces skew of period that depends on difference in time (hereinafter, "reach time") at which each signal reaches the corresponding threshold value as in the case of the delay time (see the timing diagram illustrated by (C) of FIG. 13). The thus-produced skew $\Delta t$ is $0.7\tau$ (=$1.39\tau$−$0.69\tau$), which is obtained based the difference in reach time to the threshold voltages calculated above.

The high level of signals RS and CP outputted from the DRV 4 are converted to the supply voltage (Vdrv) (see the timing diagram illustrated by (C) of FIG. 13), and inputted into the CCD 2 via the resistor circuit (not shown in FIG. 13).

The skew $\Delta t$ varies depending on variation in the threshold voltages Vtp and Vtn. The range of the variation further depends on the time constant t of the input signals of the DRV 4 because of the relation described above. Put another way, magnitude of influence of the variation in the threshold voltages is proportional to the value of $\tau$.

As described above, as for timing between different edges, skew may be produced not only by difference between tpLH and tpHL but also by variation in the threshold voltages Vtp and Vtn. Although there is more characteristic correlation between the threshold voltages Vtp and Vtn than the characteristic correlation between tpLH and tpHL, the threshold voltages Vtp and Vtn essentially vary independently of each other.

In contrast, skew is not produced by the same edges as in the case of delay time. This is also because correlation between Vtp and Vtp or between Vtn and Vtn is strong (characteristics thereof are substantially identical to each other) while correlation between Vtp and Vtn is weak. Accordingly, so long as the time constant of the signal xrs and the time constant of the signal xcp are substantially equal to each other, even when the threshold voltages vary, the threshold voltages vary in a similar manner, thus skew is subdued.

Note that in the configuration illustrated in FIG. 13, influence exerted by tpLH and tpHL are not taken into consideration to describe skew by the threshold voltages (i.e., it is assumed that tpLH=tpHL=0). Actual skew is produced by a combined total of influence related to the threshold voltages and difference between tpLH and tpHL.

As described above, the conventional technique is disadvantageous in that although the technique allows skew reduction when the skew is produced between same edges (e.g., a rising edge and a rising edge) of signals, on which timing requirement is imposed, the technique cannot attain skew reduction when the skew is produced between different edges (e.g., a rising edge and a falling edge) due to difference between rise delay time and fall delay time at a driver and variation in high-threshold voltage/low-threshold voltage of the driver.

SUMMARY OF THE INVENTION

It is an object of the present invention to at least partially solve the problems in the conventional technology.

A sensor driving circuit according to an aspect of the present invention comprises: an image sensor that converts light reflected from an original to be read into electric signals; a driver circuit that drives the image sensor; and a timing generator circuit configured to generate a timing signal that controls the image sensor, wherein the driver circuit is configured to include a first inverting output buffer circuit and a second inverting output buffer circuit that are equivalent to each other and connected in a double stage series. The timing generator circuit is configured to output a timing signal of which polarity is the same as polarity of an input signal inputted into the image sensor. A sensor driving means according to another aspect of the present invention comprises: an image sensor for converting light reflected from an original to be read into electric signals; a driver circuit for driving the image sensor; and a timing generator circuit for generating a timing signal for controlling the image sensor. The driver circuit is configured to include a first inverting output buffer circuit and a second inverting output buffer circuit that are equivalent to each other and connected in a double stage series, and the timing generator circuit is configured to output a timing signal of which polarity is the same as polarity of an input signal inputted into the image sensor.

The above features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a schematic block diagram for illustrating influence of threshold voltages at inputs and outputs of a pre-DRV 10 and a DRV 4 in the configuration illustrated in FIG. 1 and timing charts for illustrating operations;

FIG. 4 is a block diagram illustrating an exemplary circuit that enhances effectiveness of skew cancellation;

FIG. 5 is a schematic block diagram and timing charts for illustrating configuration that subdues variation in input threshold voltages even when power source of the TG 1' fluctuates;

FIG. 12 is a schematic block diagram for illustrating advantage and disadvantage of the driving circuit illustrated in FIG. 11 and timing charts for illustrating operations; and FIG. 13 is a schematic block diagram and timing charts for illustrating how skew is produced by threshold voltages in the configuration (at inputs and outputs of a DRV 4) illustrated in FIG. 11.

DETAILED DESCRIPTION OF THE PREFERRED EMBODIMENTS

Figure 1:
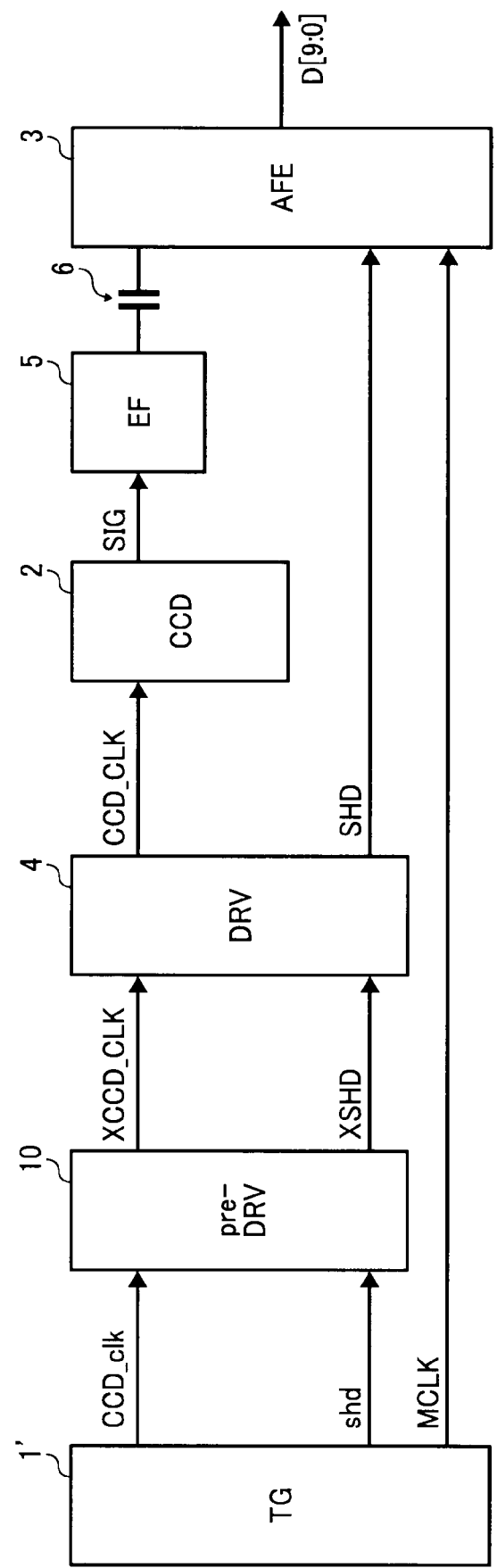
FIG. 1 is a functional block diagram of a driving circuit that drives a CCD and an AFE according to an exemplary embodiment of the present invention.

Exemplary embodiments of the present invention are described in detail below with reference to the accompanying drawings. FIG. 1 is a functional block diagram of a driving circuit that drives a CCD and an AFE according to an embodiment of the present invention. Elements and portions that are identical or correspond to those in FIG. 10 are denoted by like reference numerals and symbols.

Figure 10:
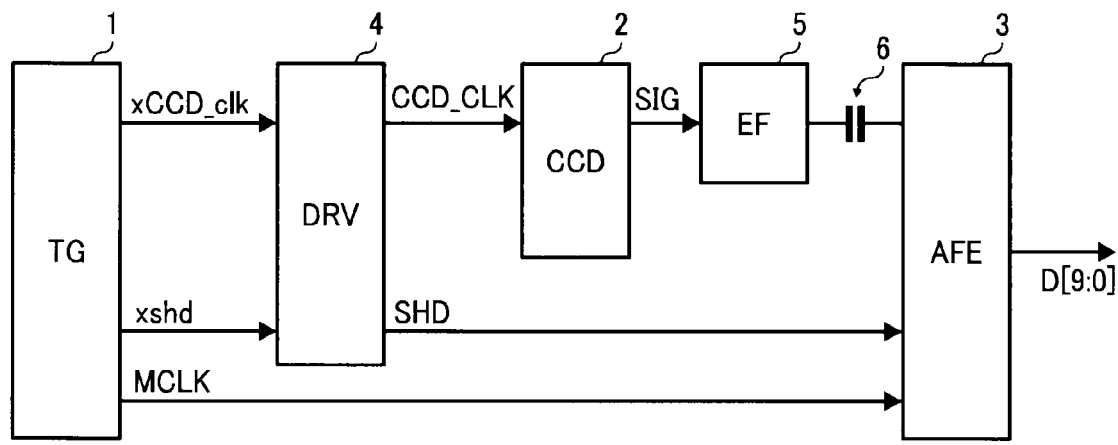
FIG. 10 is a functional block diagram of a conventional driving circuit that drives a CCD and an AFE.

In the configuration according to the embodiment illustrated in FIG. 1, an inverting driving circuit that is identical in configuration with the DRV 4 and that serves as a pre-driver (pre-DRV) 10 is additionally arranged at a preceding stage of the DRV 4 in the driving circuit illustrated in FIG. 10.

In the configuration illustrated in FIG. 1, unlike FIG. 10, polarities of a CCD-drive clock signal CCD_clk and a sample/hold signal shd outputted by a TG 1' are the same as the polarities of the signal that are inputted into the CCD 2 and the AFE 3. The polarities of an output signals of the TG 1' have been changed from that of FIG. 10 because the pre-DRV 10 and the DRV 4, each of which is an inverting driver, are arranged in two stages in the configuration illustrated in FIG. 1. The configuration of a portion subsequent to the DRV 4 is the same as that illustrated in FIG. 10, and repeated description is omitted.

Figure 2:
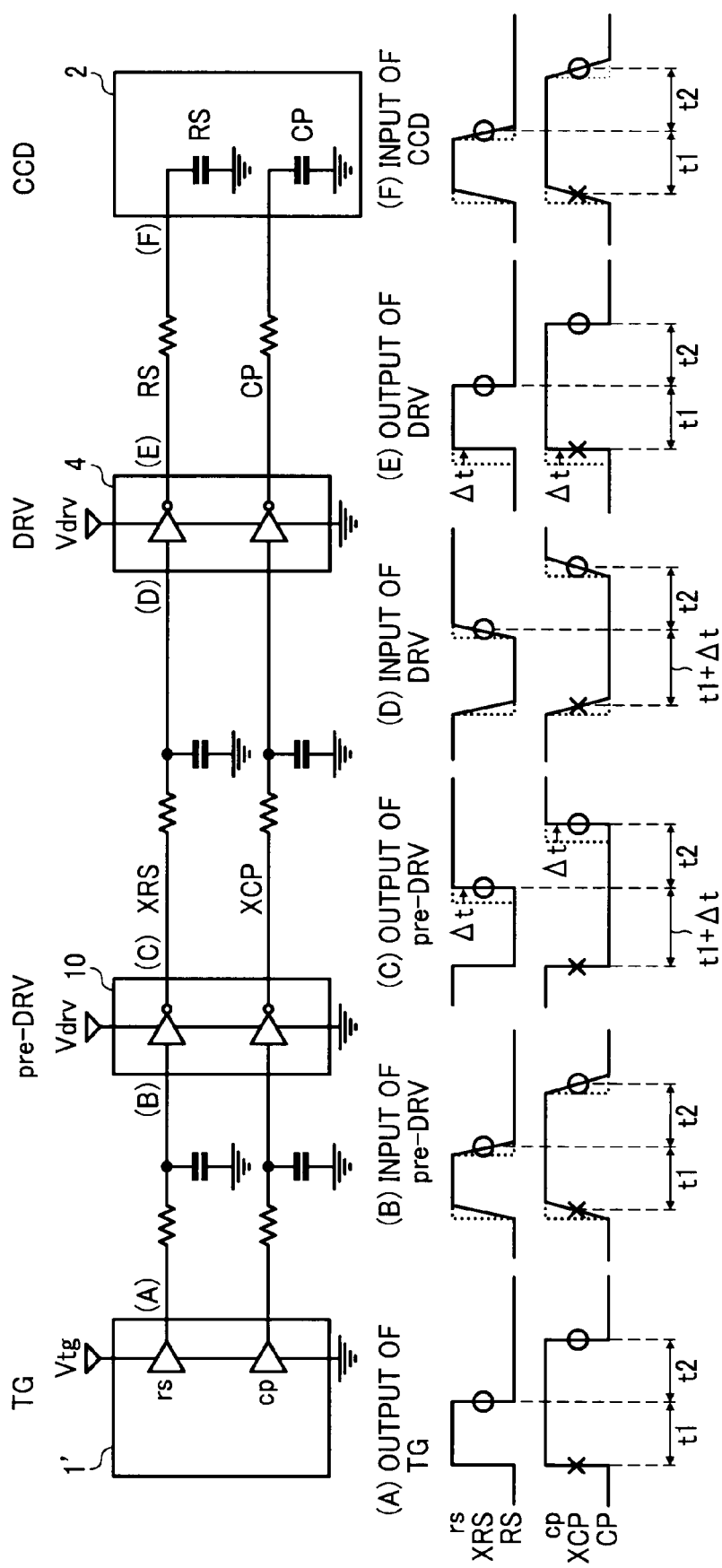
FIG. 2 is a schematic block diagram and timing charts for illustrating operations of the driving circuit illustrated in FIG. 1.

FIG. 2 is a schematic block diagram for illustrating operations and timing charts for illustrating the operations of the driving circuit according to the present embodiment.

Signals rs and cp outputted from TG 1' (which have the same logic polarity as that of the CCD input signals RS and CP (see (A) of FIG. 2)) are inputted into the pre-DRV 10 via an RC circuit (see (B) of FIG. 2). At the input of the pre-DRV 10, the phase difference between the falling edge (indicated by "circle") of the signal rs and the rising edge (indicated with "x") of the signal cp is t1.

As in the DRV 4 illustrated in FIG. 12, tpLH is longer than tpLH in the pre-DRV 10 by Δt. Accordingly, the rising edge ("circle") of an output signal XRS of the pre-DRV 10 is delayed relative to the falling edge ("x") of an output signal XCP of the pre-DRV 10 by Δt. This skew causes the rising edge of the signal XRS and the falling edge of the signal XCP to have the phase difference of t1+Δt (see (C) of FIG. 2).

The output signals of the pre-DRV 10 are inputted into the DRV 4 via the RC circuit (see (D) of FIG. 2). Because tpLH is longer by Δt than tpLH in the DRV 4 as in the pre-DRV 10, the rising edge ("x") of the output signal CP of the DRV 4 is delayed by Δt relative to the falling edge ("circle") of the output signal RS of the DRV 4 (see (E) of FIG. 2). In other words, the direction of the skew produced in the DRV 4 is opposite to the direction of skew produced in the pre-DRV 10.

Accordingly, the skew produced in the pre-DRV 10 (see (C) of FIG. 2) is cancelled out by the skew at the output of the DRV 4, causing the phase difference between the falling edge of the signal RS and the rising edge of the signal CP to be t1, which is equal to the phase difference at the output stage of the TG 1' (see (A) of FIG. 2).

As described above, according to the present embodiment, the skew produced in the DRV 4 is canceled out by the pre-DRV 10. Thus, even in the timing between different edges, the skew may be restrained.

The advantage described above is obtained on a precondition that the pre-DRV 10 and the DRV 4 are substantially identical to each other in characteristics (tpLH and tpHL). When devices of the same model are employed as the pre-DRV 10 and the DRV 4 as described above, devices of a single batch are to be used in most cases (Assuming that a single lot includes 1,000 pieces of the device and four pieces are to be used per product, the probability that the pre-DRV 10 and the DRV 4 have devices of different lots is only approximately 4/1000=0.4% in other words, in the case of the remaining 99.6%, devices in the same lot are used for the pre-DRV 10 and the DRV 4).

Accordingly, characteristics of the pre-DRV 10 and those of the DRV 4 rarely vary independently of each other, and the probability that the advantage described above is not obtained is considerably low. Skew between different devices in a single lot is at most approximately ±0.5 ns. Even when characteristics of the pre-DRV 10 and those of the DRV 4 vary independently of each other, skew may be reduced by nearly a single digit of magnitude than the skew (approximately ±4 ns) produced in an apparatus according to the conventional technique.

As for the timing between same edges, even in the configuration to which the pre-DRV 10 is added as in the present embodiment, because each of the edges is inputted via the same driver, skew may be restrained as well.

More specifically, according to the present embodiment, the skew between the different edges is restrained without sacrificing the advantage (reduction of skew between same edges) of the configuration according to the conventional technique. In other words, according to the present embodiment the skew may be restrained irrespective of combination of the edges.

Meanwhile, tpLH and tpHL have a dependence on supply voltage (in general: the higher the supply voltage, the shorter the delay time). Therefore, when different supply voltages are used in the pre-DRV 10 and the DRV 4, tpLH and tpHL at the pre-DRV 10 and those at the DRV 4 become inconsistent with each other (have difference), thus skew cancellation accuracy deteriorates. Hence, it is desirable to drive the pre-DRV 10 and the DRV 4 with the same supply voltage (Vdrv).

An effect of reducing skew produced by variation in input threshold voltages according to the present embodiment is described below.

FIG. 3 is a schematic block diagram for illustrating influence of the threshold voltages at inputs and outputs of the pre-DRV 10 and the DRV 4 in the configuration illustrated in FIG. 1 and timing charts for illustrating operations. Operations from the TG 1' (not shown in FIG. 3) to output from the pre-DRV 10 (see the timing charts illustrated by (B) and (C) in FIG. 3) are essentially the same as operations from the TG 1 to output from the DRV 4 illustrated in FIG. 13.

The configuration according to the present embodiment differs from the configuration illustrated in FIG. 13 in that because logic is inverted at the output of the pre-DRV 10, the phase difference between the rising edge ("circle") of the signal XRS and the falling edge ("x") of the signal XCP in the configuration illustrated in FIG. 3 is $t1+\Delta t1$ ($\Delta t1=0.7\tau a$) rather than t1 (Note that although Δt of FIG. 13 is equivalent to Δt1 of FIG. 3, t1 and Δt1 are denoted by different sets of symbol and numeral for convenience).

Note that τa is a time constant of the signals rs and cp between the TG 1' and the pre-DRV 10. At the output of the pre-DRV 10, high levels of the signals are converted to the Vdrv. The thus-converted signals are inputted into the DRV 4 (main driver) via the RC circuit. Because the relation between the rising edge of the signal XRS and the falling edge of the signal XCP at the input of the DRV 4 is maintained, the phase difference t1+Δt is unchanged (see (D) of FIG. 3).

Operation performed at the output of the DRV 4 is similar to that at the output of the DRV 4 described above with reference to FIG. 13. More specifically, in the configuration illustrated in FIG. 3, Vtp is approximately one third of the Vdrv and Vtn is approximately one sixth of the Vdrv. In the above mentioned case, when the time constant of the signals XRS and XCP between the pre-DRV 10 and the DRV 4 is assumed to be τb: a period of time from rise start of a signal to a point in time where the signal reaches the threshold voltage Vtp is approximately 0.41τb; while a period of time from fall start of a signal to a point in time where the signal reaches Vtn is approximately 1.8τb. At the output of the DRV 4, skew, which is a phase difference Δt2 (which is approximately 1.4τb) between the falling edge of the signal RS and the rising edge of the signal CP is produced. The direction of the above produced skew is opposite to the direction of the skew produced at the pre-DRV 10.

More specifically, as in the skew cancellation that is based on delay time and has been described above, the skew Δt1 (=0.7τa) produced by the threshold voltages in the pre-DRV 10 is cancelled out by the skew Δt2 (=1.4τb) produced by the threshold voltages in the DRV 4. The phase difference between the falling edge of the signal RS and the rising edge of the signal CP at the output of the DRV 4 is t1+(Δt1−Δt2)= t1+(0.7τa−1.4τb). Hence, skew is compensated in a direction to be reduced (see (E) of FIG. 3).

As described above with reference to FIG. 13, the magnitude of the skew resulting from variation in threshold voltages is influenced by the time constant of input signals of the DRV 4. For instance, as signals XPH1 and XPH2 illustrated in FIG. 11, when outputs of the DRV 4 are connected in parallel to increase drivability of the DRV 4, the fan-out number of output signals of the TG 1' is inevitably increased, and the time constant at the input of the DRV 4 is increased.

This can increase skew resulting from variation in the threshold voltages; however, in the present embodiment, by virtue of addition of the pre-DRV 10, drivability of the driver that drives signals generated by the TG 1' is increased. Thus the fan-out number of the output signal of the TG 1' is decreased and influence due to an increase in the time constant at the input of the DRV 4 described above is advantageously reduced.

As described above, according to the present embodiment, as for timing between different edges, not only skew resulting from difference between tpLH and tpHL but also skew resulting from variation in the threshold voltages Vtp and Vtn may be reduced.

Meanwhile, skew due to the threshold voltages is not produced in the same edges as in the configuration according to the conventional technique.

Configuration for reducing variation in input threshold voltages is described below.

The present embodiment disclosed reduction of the skew related to the threshold voltages as described above with reference to FIG. 3. The present embodiment is not capable of complete cancellation of skew because: signal amplitude of the input signal of the pre-DRV 10 is not equal to the signal amplitude of the input signal of the DRV 4; and because the time constant (τa) of the signal between the TG 1' and the pre-DRV 10 is not equal to the time constant (τb) of the signal between the pre-DRV 10 and the DRV 4 (in FIG. 3, Δt1≠Δt2).

To this end, a voltage dividing resistor RA and a voltage dividing resistor RB may be added between the pre-DRV 10 and the DRV 4, and the amplitude of the input signal of the pre-DRV 10 and the amplitude of the input signal of the DRV 4 may be equalized. Thus the skew Δt1 produced by the pre-DRV 10 may be equalized with the skew Δt2 produced by the DRV 4, and the skew cancellation effect may be enhanced.

In the configuration illustrated in FIG. 3, skew Δt1−Δt2, which is remaining skew without being cancelled out by the pre-DRV 10 and the DRV 4, depends on the time constant τa of the input signal of the pre-DRV 10 and the time constant τb of the input signal of the DRV 4. This is because, as described above, there holds the following equation: $\Delta t1 − \Delta t2 = 0.7\tau a − 1.4\tau b$. To effectively cancel the skew related to the threshold voltages, a constant of the RC circuit arranged between the pre-DRV 10 and the DRV 4 may be set such that τa and τb satisfy the following relation: $\tau a:\tau b=2:1$.

The relation between τa and τb is determined by the signal amplitudes of the input signal of the pre-DRV 10 and the input signal of the DRV 4. The above values are when the amplitude of the input signal of the pre-DRV 10 and the supply voltage of the DRV 4 are the Vtg and Vdrv, respectively. When the amplitude of the input signal of the pre-DRV 10 is equal to the amplitude of the input signal of the DRV 4, the following equation is obtained: $\Delta t1 − \Delta t2 = 0.7*(\tau a − \tau b)$. Accordingly, in this situation, the constant of the RC circuit is suitably set such that the following equation is satisfied: $\tau a = \tau b$. In this situation, what is essentially required is that arrival of the input signal of the pre-DRV 10 at the threshold voltage Vtp is concurrent with arrival of the input signal of the DRV 4 at the threshold voltage Vtn. This requirement may be satisfied by adjusting the signal amplitudes and the time constants independently; however, in order to cancel the skew appropriately even when there is variation in the threshold voltages, it is desirable that the amplitude and the time constant of the input signal of the pre-DRV 10 are configured to be equal to the amplitude and the time constant of the input signal of the DRV 4.

FIG. 5 is a schematic block diagram with timing charts for illustrating configuration that reduces variation in the input threshold voltages even when supply voltage (Vtg) of the TG 1' fluctuates. As described above, by causing the amplitude and the time constant of the input signal of the pre-DRV 10 to be equal to the amplitude and the time constant of the input signal of the DRV 4, appropriate cancellation of the skew resulting from variation in the threshold voltages is attained. However, if the supply voltage (Vtg) of the TG 1' fluctuates, only the amplitude of the input signal of the pre-DRV 10 varies, thus the skew may not be canceled out completely.

To this end, in the configuration illustrated in FIG. 5, the amplitude of the output signal of the pre-DRV 10 is changed depending on the Vtg. In the configuration illustrated in FIG. 5, divided voltages output from a voltage-dividing resistor circuit 11 are applied to the gates edge of NMOS transistor Tr1 and Tr2, thereby controlling on-resistance of the NMOS transistor Tr1 and on-resistance of the NMOS transistor Tr2 to change a voltage-dividing ratio by the Vtg.

When the Vtg fluctuates at relatively high levels, gate voltages across the NMOS transistors Tr1 and Tr2 rise, and the on-resistances decrease. Because this increases a voltage-dividing ratio, the amplitude of the input signal of the DRV 4 may be adjusted to the Vtg. In contrast, when the Vtg fluctuates at relatively low levels, the gate voltages of the NMOS transistors Tr1 and Tr2 drop, and the on-resistances increase. Because this decreases the voltage-dividing ratio, the amplitude of the input signal of the DRV 4 may be adjusted to the Vtg.

Because the amplitude of the input signal of the pre-DRV 10 may be changed depending on the Vtg as described above, even in a situation where the Vtg fluctuates, the skew may be cancelled out appropriately.

In the configuration illustrated in FIG. 5, the voltage-dividing ratio is changed based on the Vtg. A similar effect as that obtained from this configuration may also be obtained alternatively by adding a level shifter at each of a subsequent stage of the pre-DRV 10 and a subsequent stage of the DRV 4 (or, further alternatively, by using drivers capable of level shifting). It should be noted that, with the above described alternative configuration, the voltage across the level shifter at the output of the pre-DRV 10 is set to the Vtg whereas the voltage across the level shifter at the output of the DRV 4 is preferably set to the Vdrv in order to drive the CCD 2. In other words, even when the level shifters are identical to each other, because supply voltages supplied to the level shifters differ from each other, tpLH and tpHL at the level shifter at the output of the pre-DRV 10 differ from those at the output of the DRV 4 (this is because delay time depends on the supply voltage). Accordingly, skew is produced by difference in delay time described above, which may make skew cancellation in total in this configuration less effective than that of the configuration illustrated in FIG. 5.

Figure 6:
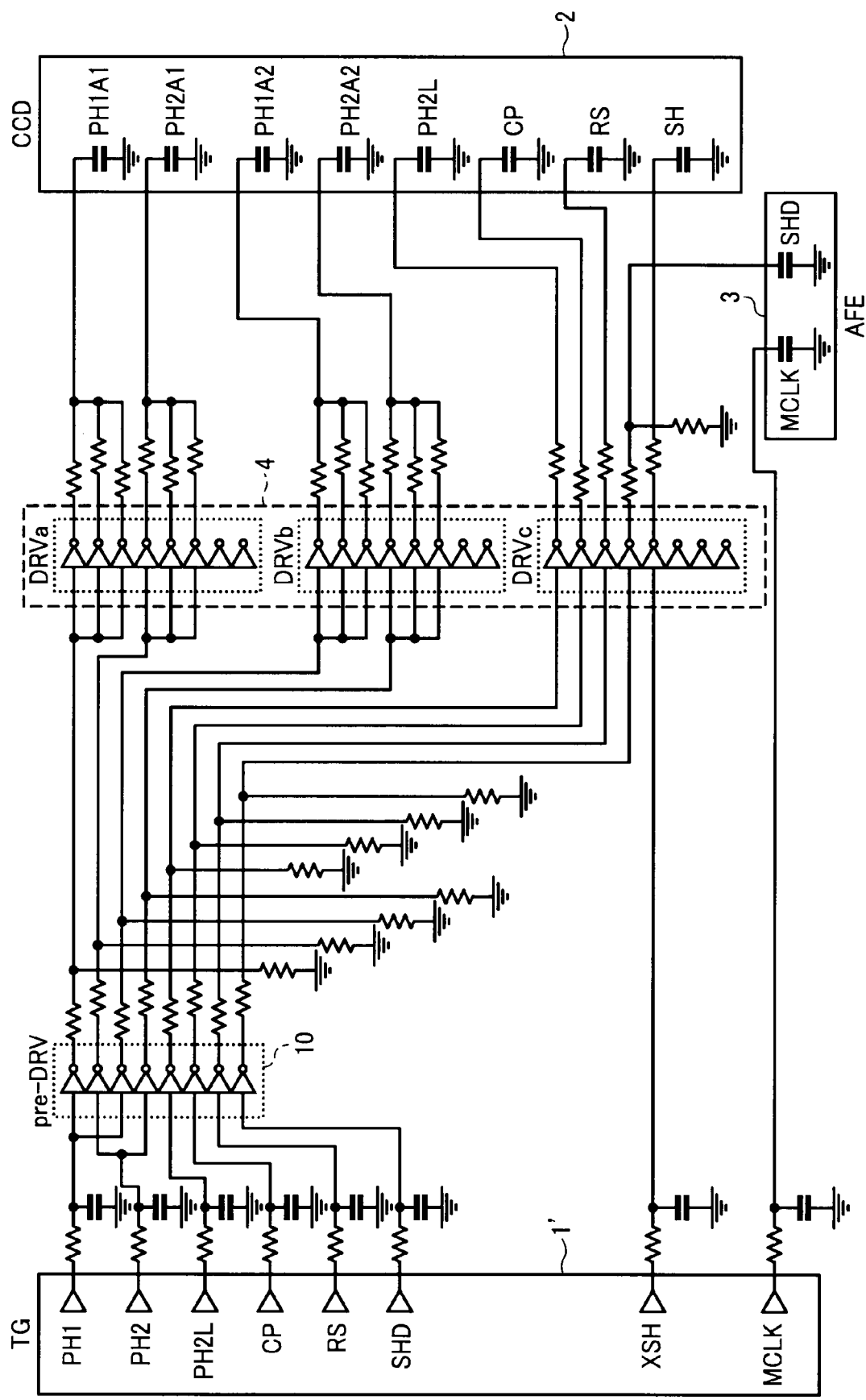
FIG. 6 is a schematic circuit diagram of the entire configuration of the driving circuit for the CCD 2 and the AFE 3 according to the present embodiment.

FIG. 6 is a schematic circuit diagram of the entire configuration of the driving circuit that includes the CCD 2 and the AFE 3 configured as described above.

FIG. 6 illustrates an example configuration in which the voltage-dividing resistors are provided to adjust amplitudes of input signals of the pre-DRV 10. Capacitors to be provided in the RC circuit between the pre-DRV 10 and the DRV 4 are omitted from FIG. 6.

Figure 11:
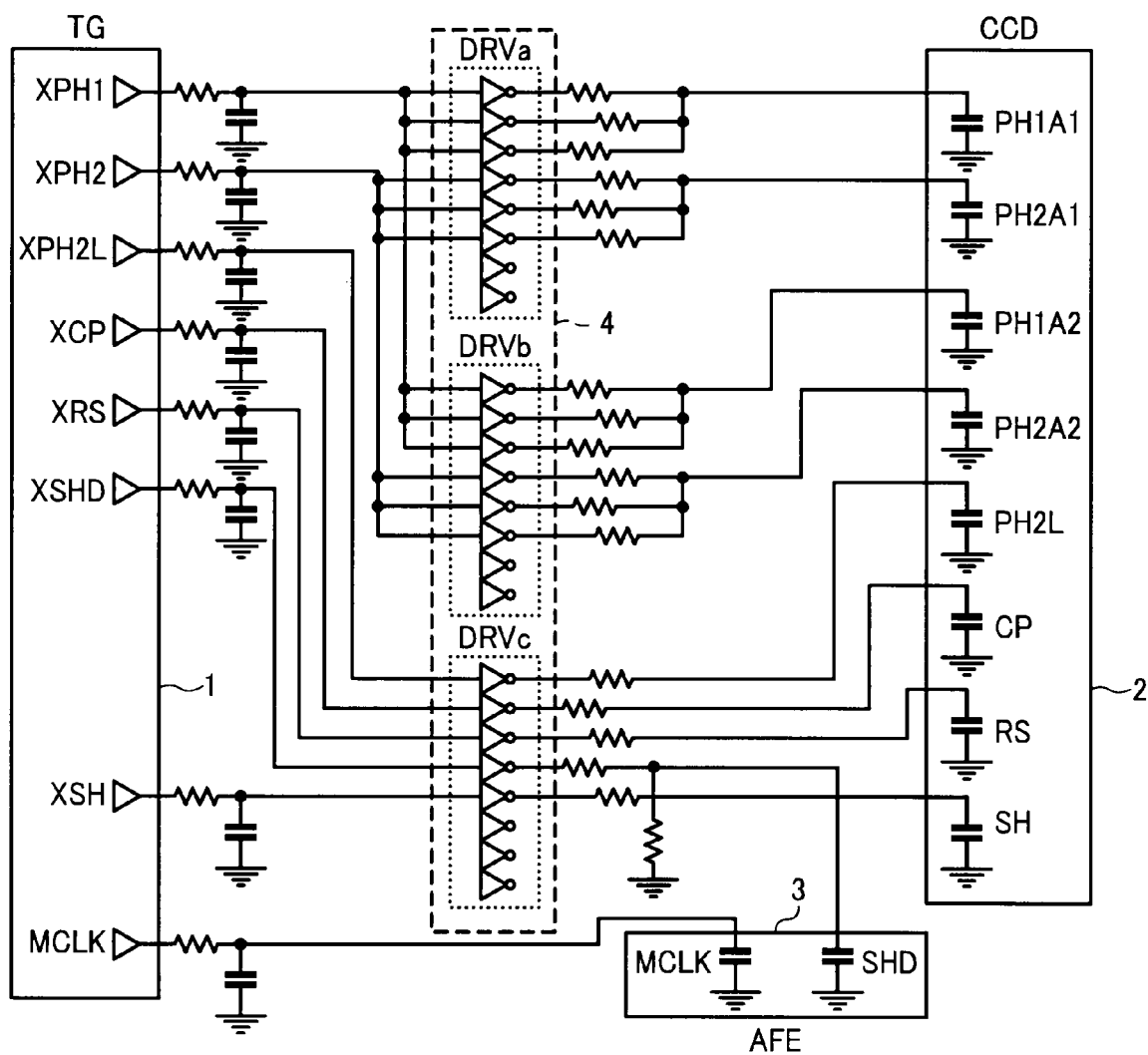
FIG. 11 is an explanatory circuit diagram illustrating details of the driving circuit depicted in FIG. 10.

The present embodiment aims at driving the CCD 2 and the AFE 3 at relatively high speed; however, there may be cases where the CCD 2 and the AFE 3 are to be driven at relatively low speed and the configuration illustrated in FIG. 11 may be used satisfactorily. To implement different use patterns of a high-speed mode and a low-speed pattern mode, there arises a problem that a single TG may not be shared between the high-speed mode and the low-speed mode because the logic of the output signal of the TG in the configuration of FIG. 6 is opposite to that of FIG. 11.

To this end, the TG may be configured such that output of the TG is switchable between a positive logic and a negative logic by using a register or an external terminal. This allows the single TG to be shared between the high-speed mode and the low-speed mode, thereby reducing cost of constituents of the TG, developing cost of the TG, and period of time necessary for development.

Figure 7A:
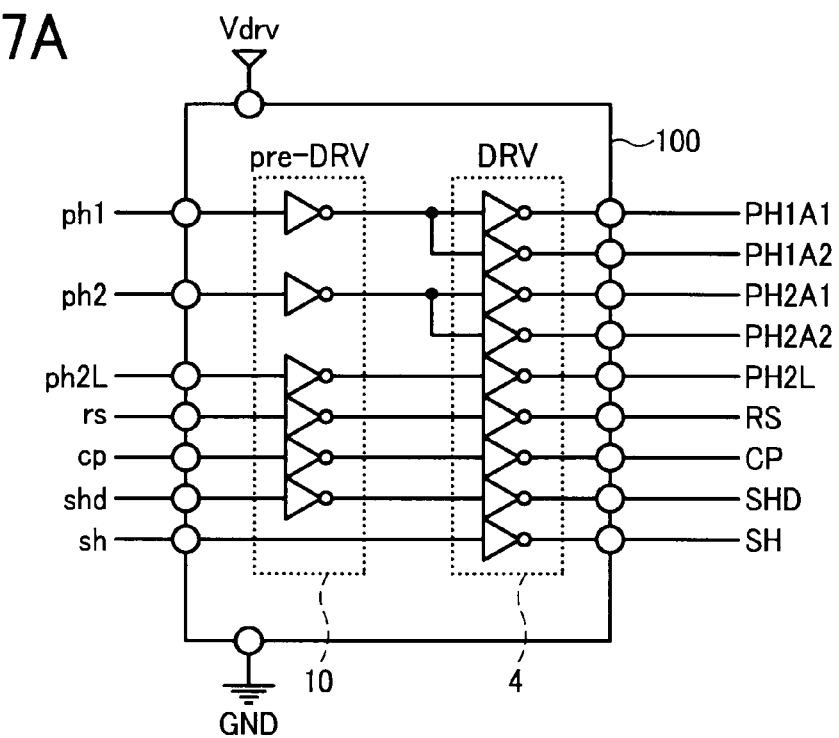
FIG. 7A and FIG. 7B are schematic functional block diagrams for illustrating modifications that further enhance effect of the present embodiment.
Figure 7B:
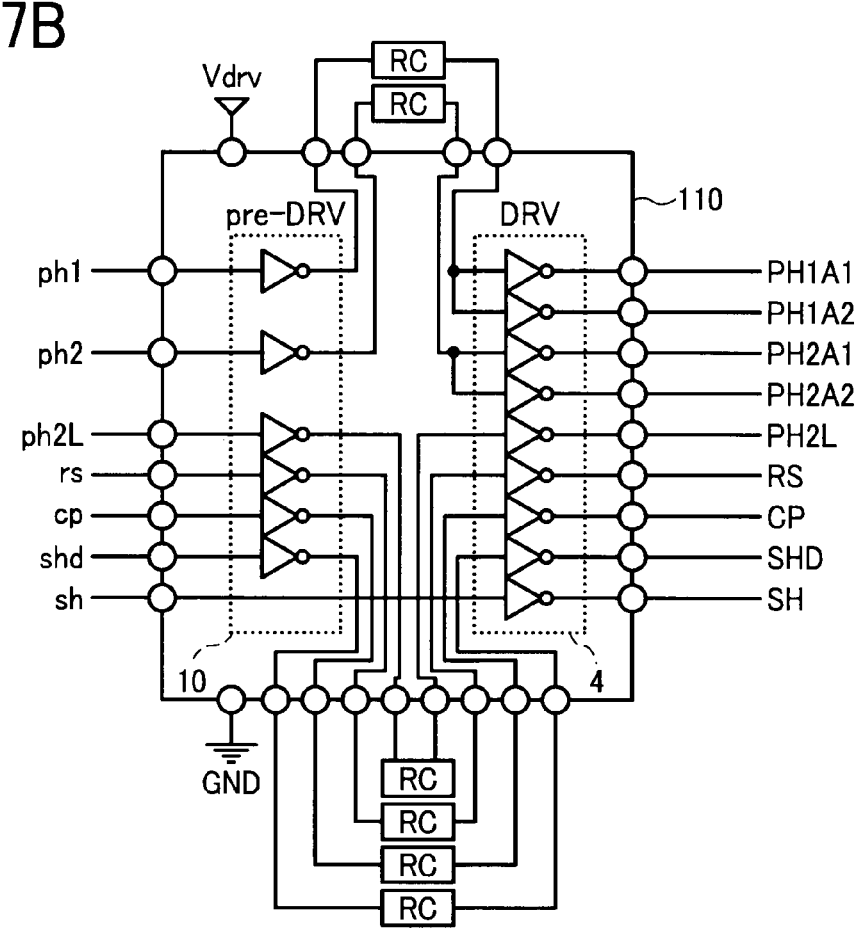

FIG. 7A and FIG. 7B are schematic functional block diagrams for illustrating modifications that further enhance the effects of the present embodiment.

The configuration that additionally includes the pre-DRV 10 as described above allows restraint of the skew resulting from variation in delay time and threshold voltages. To further restrain the skew, it is effective to mount the pre-DRV 10 and the DRV 4 on a single semiconductor chip as an IC device as illustrated in FIG. 7A and FIG. 7B.

FIG. 7A illustrates a modification in which the pre-DRV 10 and the DRV 4 are simply connected in series and configured as an IC device. By configuring the pre-DRV 10 and the DRV 4 as a driver device 100 that includes a pre-DRV unit and a DRV unit on a single semiconductor chip, characteristics of the pre-DRV 10 and the DRV 4 are further likely to be identical to each other, thereby effect of restraining the skew may be enhanced. The skew with the configuration on the single semiconductor chip described above is generally approximately ±0.1 to 0.2 ns at maximum. Hence, this configuration allows further reduction of the skew such that the skew is reduced approximately by half as compared with the configuration, in which the drivers are configured as independent devices.

If the amplitude of the input signal of the DRV 4 is controllable, skew resulting from variation in the threshold voltages may also be reduced. In view of this, as in a driver device 110 illustrated in FIG. 7B, output terminals and input terminals may be added to the pre-DRV 10 and the DRV 4, respectively, to allow addition of external elements, such as an RC circuit. When the external elements are unnecessary, the output terminals may be connected to the input terminals. Elements and portions in FIG. 7B that are identical or correspond to those in FIG. 7A are denoted by like reference numerals and symbols, and repeated descriptions are omitted.

Figure 8:
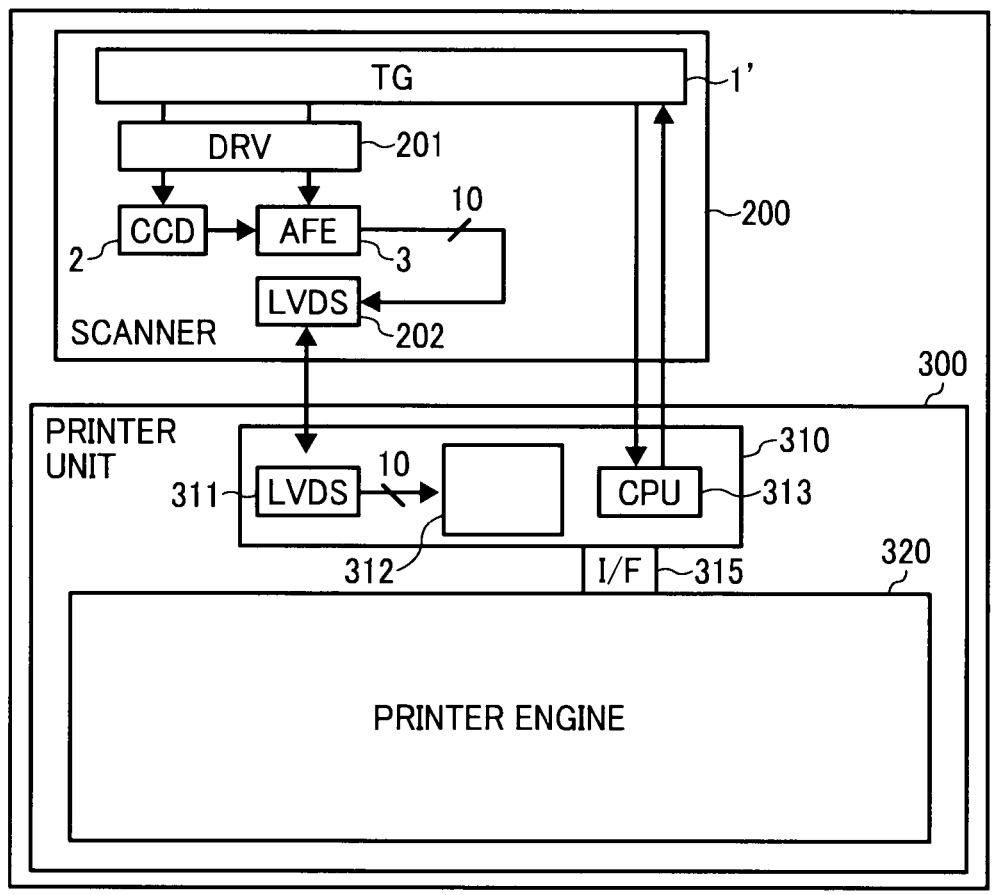
FIG. 8 is a functional block diagram illustrating a scanner that includes the driving circuit according to the present embodiment and an exemplary configuration where the scanner, as an image reading apparatus, is applied to a copier.

FIG. 8 is a functional block diagram illustrating a scanner that includes the driving circuit according to the present embodiment and an exemplary configuration where the scanner, as an image reading apparatus, is applied to a copier.

Referring to FIG. 8, the scanner 200 includes the TG 1' that generates drive signals for the CCD 2 and the AFE 3, a driver unit 201 that includes the pre-DRV 10 and the DRV 4 arranged in series connection, the CCD 2, the AFE 3, and a low voltage differential signaling (LVDS) circuit 202, via which an output of the AFE 3 is inputted into a printer unit 300. The LVDS circuit 202 conducts data communications with an LVDS circuit 311 provided on a printer controller 310 in the printer unit 300.

The printer unit 300 includes the printer controller 310 that controls operations of the printer unit 300 and the scanner 200, a printer engine 320 that includes a printing mechanism, and an interface (I/F) circuit 315, via which data is exchanged between the printer controller 310 and the printer engine 320.

By virtue of the driving circuit of the embodiment (the driver unit 201) mounted on the scanner 200, the scanner 200 attains high-speed operation, which allows high-speed copying operation. This leads to improvement of productivity of the copier.

In the current color CCD, for per color of red, green, and blue (RGB), one-channel output method, two-channel output method (EVen/Odd), or four-channel method (EVen/Odd, Front/Rear) are in a mainstream. Since the driving circuit according to the above described present embodiment is employed, drive frequency per channel may be increased, so that a less expensive driving method becomes selectable. More specifically, for instance, selecting a two-channel method instead of a four-channel method or selecting a one-channel method instead of a two-channel method becomes possible, which leads to cost reduction.

Figure 9:
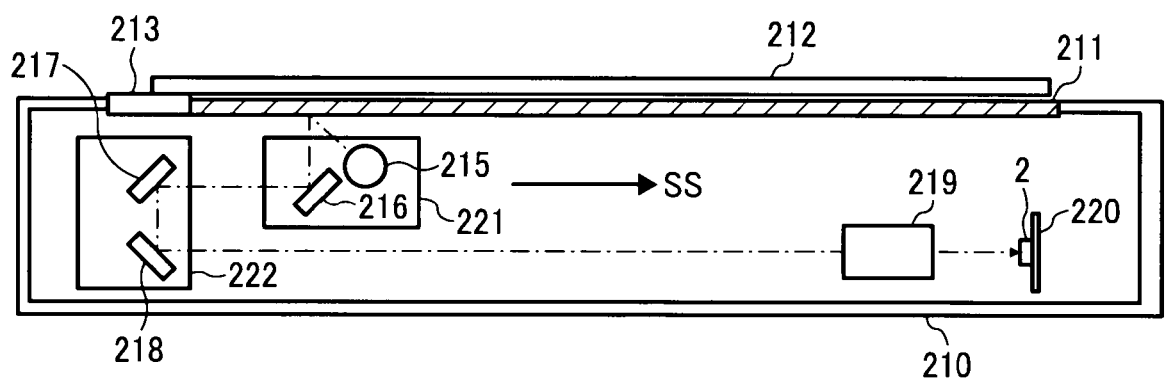
FIG. 9 is a schematic diagram of an example of an optical reading system of a scanner 200.

FIG. 9 is a schematic diagram of an example of an optical reading system of the scanner 200.

In FIG. 9, on the top surface of a housing 210 of the scanner 200, a contact glass 211 is provided. A pressure plate 212 that presses the back surface of the original (not shown) against the contact glass 211 so that a surface to be scanned (hereinafter, "scan surface") of the original is brought into close contact with the contact glass 211 is also provided on the contact glass 211. A white reference plate 213 for use in forming a white reference image for shading correction is provided at a left end portion (which is a scan-start position) of the contact glass 211.

A lamp 215 illuminates the scan surface of the original to be read. Light reflected from the scan surface is further sequentially reflected from a first mirror 216, a second mirror 217, and a third mirror 218, and guided to a lens 219 where the light is converged by the lens 219 so that the CCD 2, arranged on a reading control board 220, is irradiated with the light.

The lamp 215 and the first mirror 216 are mounted on a first carriage 221 to be carried back and force in a sub-scanning direction SS. The second mirror 217 and the third mirror 218 are mounted on a second carriage 222 to be carried back and force in the sub-scanning direction SS. The second carriage 222 is moved at a half speed of the speed of the first carriage 221, to maintain an optical path length from the exposure glass 2 to the CCD 2.

As described above, the modification is configured such that the same driver as the CCD driver that drives output signals of the timing generator is arranged at a preceding stage of the CCD driver and the driver at the preceding stage cancels variation in rise/fall delay time and variation in high/low threshold voltages of the driver. Accordingly, not only skew between the same edges of signals but also skew between different edges of signals may be reduced.

The thus-attained skew reduction allows the CCD and AFE, which are to be driven based on the output signals of the timing generator, at relatively high speed, thereby increasing productivity of equipment that includes an apparatus according to an aspect of the present invention.

Because drive frequency per output channel (ch) of the CCD can be increased, a less expensive drive method may become selectable. More specifically, for instance, selecting a two-channel scheme instead of a four-channel scheme or selecting a one-channel scheme instead of a two-channel scheme, is allowed, which leads to cost reduction of the equipment.

The present embodiments and modifications of the present invention can be combined appropriately in various manners without departing from the widest scope consistent with the principles and features described herein.

According to aspects of the present invention, a driver circuit is configured by connecting a first inverting buffer circuit and a second inverting buffer circuit that are identical to each other in configuration and connected in series to form two stages with the first inverting buffer circuit at the first stage of the two stages. Accordingly, variation in rise/fall delay time of output signals of the first inverting output buffer circuit and variation in high/low threshold voltages of the driver can be cancelled by variation in rise/fall delay time of output signals of the second inverting output buffer circuit and variation in high/low threshold voltages of the driver, whereby not only skew between same edges of signals but also skew between different edges of signals can be advantageously reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A sensor driving circuit comprising:
   an image sensor that converts light reflected from an original to be read into electric signals;
   a driver circuit that drives the image sensor; and
   a timing generator circuit configured to generate a timing signal that controls the image sensor,
   wherein the driver circuit is configured to include a first inverting output buffer circuit and a second inverting output buffer circuit that are equivalent to each other and connected in a double stage series,
   the timing generator circuit is configured to output a timing signal of which polarity is the same as polarity of an input signal inputted into the image sensor,
   supply voltage into the first inverting output buffer circuit is configured to be the same as supply voltage into the second inverting output buffer circuit,
   the supply voltage is configured to be enough to make the image sensor operate, and
   amplitude of an input signal that is inputted into the first inverting output buffer circuit and amplitude of an input signal that is inputted into the second inverting output buffer circuit are configured to be equalized.

2. The sensor driving circuit according to claim 1, further comprising an amplitude adjusting unit that adjusts amplitude of an input signal inputted into the first inverting output buffer circuit with amplitude of an input signal inputted into the second inverting output buffer circuit.

3. The sensor driving circuit according to claim 1, wherein signal rise time and signal fall time of each of the first inverting output buffer circuit and the second inverting output buffer circuit are set such that a period of time required by an input signal fed to the first inverting output buffer circuit to reach an input threshold voltage of a corresponding driver is equal to a period of time required by an input signal fed to the second inverting output buffer circuit to reach an input threshold voltage of a corresponding driver.

4. The sensor driving circuit according to claim 1, wherein amplitude of an input signal inputted into the second inverting output buffer circuit of the driver circuit is adjustable according to supply voltage supplied to the timing generator circuit.

5. A driver device comprising:
   the sensor driving circuit according to claim 1
   wherein the first inverting output buffer circuit and the second inverting output buffer circuit are integrated onto a single semiconductor chip.

6. The sensor driving circuit according to claim 1, wherein the first inverting output buffer circuit and the second inverting output buffer circuit are integrated onto a single semiconductor chip.

7. The sensor driving circuit according to claim 1, further comprising:
   a switching unit that switches polarity of the timing signal outputted from the timing generator circuit.

8. An image reading apparatus comprising the sensor driving circuit according to claim 1.

9. An image forming apparatus comprising the image reading apparatus according to claim 8 as an image reading unit.

10. A sensor driving circuit comprising:
    an image sensing means for converting light reflected from an original to be read into electric signals;
    a driver means for driving the image sensor; and
    a timing generator means for generating a timing signal for controlling the image sensor, wherein
    the driver means is configured to include a first inverting output buffer means and a second inverting output buffer means that are equivalent to each other and connected in a double stage series,
    the timing generator means is configured to output a timing signal of which polarity is the same as polarity of an input signal inputted into the image sensing means,
    supply voltage into the first inverting output buffer means is configured to be the same as supply voltage into the second inverting output buffer means,
    the supply voltage is configured to be enough to make the image sensing means operate, and
    amplitude of an input signal that is inputted into the first inverting output buffer means and amplitude of an input signal that is inputted into the second inverting output buffer means are configured to be equalized.

\* \* \* \* \*